United States Patent [19]

Asakai et al.

[11] 3,939,608
[45] Feb. 24, 1976

[54] WINDOW PANE WEATHER STRIP FIXTURE

[75] Inventors: Masaru Asakai, Tokyo; Hiroshi Inamoto, Yokohama, both of Japan

[73] Assignee: Nissan Motor Co., Ltd., Yokohama, Japan

[22] Filed: Oct. 15, 1974

[21] Appl. No.: 515,064

[30] Foreign Application Priority Data

Oct. 19, 1973  Japan .................. 48-122289[U]

[52] U.S. Cl. .................. 49/488; 49/493; 49/495
[51] Int. Cl.² .................................. E06B 7/16
[58] Field of Search ......... 49/391, 493, 495, 392, 49/488, 489, 494

[56] References Cited

UNITED STATES PATENTS

| | | | |
|---|---|---|---|
| 2,687,914 | 8/1954 | Schrum | 49/495 X |
| 2,737,412 | 3/1956 | Smith et al. | 49/493 |
| 3,600,858 | 8/1971 | Savell | 49/488 |

Primary Examiner—Philip C. Kannan

[57] ABSTRACT

A generally C-shaped fixture clip and a retainer hold the weather strip tight against the pane of a closed window of a hard top car without preventing opening of the door with the window closed.

7 Claims, 6 Drawing Figures

WINDOW PANE WEATHER STRIP FIXTURE

The present invention relates in general to a window construction, and particularly to a window shielding and fixing construction for use in an automotive body. More specifically, this invention is concerned with the improvement in or relating to clip means for fixing a weather strip at the upper edge portion of a door opening of a hard top automotive body so as to positively shield and hold a window pane against rainstorms, etc., when closed, and from laterally outward movements during high speed running caused by pressure difference inside and outside of the cabin.

In general, an automotive body construction G like a hard top as diagrammatically shown in FIG. 1, there is no door sash in the upper edge portion of the door D for an appearance reason. As shown in cross section in FIG. 2, the upper edge portion of a door window pane 10 contacts tightly with a door weather strip 12 fixed in position on the outer panel 14 of a roof side rail G' of the uppermost edge of the door opening by using screws 16 through a fixture or retainer 18, so that such engaging components serve all together to prevent positively water during rainstorms or washing, dust, or the like from entering the cabin or inside A of the body. With such an automotive door and window construction, when an automobile is operated at high speeds with the door window pane 10 kept closed, the window pane 10 is subject to above atmospheric pressure inside A, and since the leading edge portion of the window pane 10 is not firmly supported by the strip 12, it is likely to move toward the outdoor side B as indicated by a dotted line in FIG. 2 and consequently, air within the cabin space or indoor side A escapes to the outdoor side B through a narrow gap formed between the window pane 10 and the door weather strip 16 as indicated by the arrow Z, thus resulting in the problem of air leakage sounds or mechanical vibrations of the window pane during high speed driving.

In addition, when the door D is closed with the window pane 10 raised to its uppermost position, the window pane 10 is caused to hit against the door weather strip 16 in a position indicated by a dash-and-dot line in FIG. 2, thereafter it is set back to a position indicated by a solid line due to the resilient nature of the weather strip 16. Now, when the window pane 10 is raised from its open position while the door is closed, as it nears the uppermost or fully closed position to abut the weather strip 16 at a position indicated by the dash-and-dot line, the window pane 10 encroaches into or interferes with the weather stripp 16 or causes the weather strip to be deformed or turned away from its normal shape due to its resilient character, so that the weather strip may not provide proper sealing.

It is therefore a primary object of this invention to provide an improved weather strip fixture on the roof side rail to positively guide a window pane against a weather strip of the upper edge portion in such fashion that the fixture prevents the window pane from being biased laterally outwardly due to above atmospheric pressure in the cabin during high speed running, thus preventing air leaking sounds from occurring through a gap between the weather strip and the leading edge of the window pane.

It is another object of this invention to provide an improved weather strip fixture to initially cause a window pane to be guided to a correct closed position toward the outdoor side while wound up by a window pane regulator, so as to prevent a weather strip from being deformed or loosing its normal shape by the leading edge of the window pane due to the resilient character of the weather strip, thus affording the weather strip to properly engage with the window pane and provide positive sealing to guarantee the weather strip a long service life.

It is still another object of this invention to provide an improved weather strip fixture of one-piece pressed construction which can be manufactured more economically than the conventional separate type fixtures.

It is a still further object of this invention to provide an improved weather strip fixture which may rationalize the assembly processes in such a manner that elements are preassembled with a retainer and screws as a unitized subassembly ready for immediate mounting on the roof side rail.

The nature, principle, and details of the present invention, as well as further objects and advantages thereof, will become more apparent from the following detailed description with respect to preferred embodiments of the invention when read in conjunction with the accompanying drawings, where like parts are designated with like reference numerals and in which.

Figure 1:
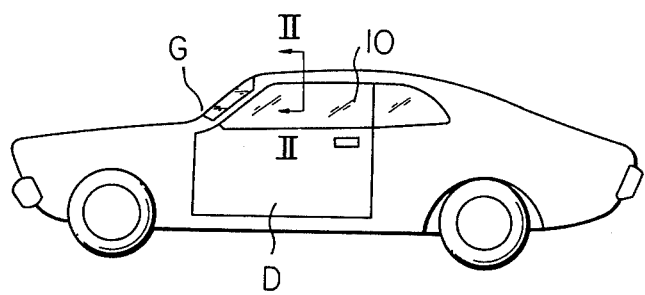
FIG. 1 is a diagrammatic side view of a hard top style automobile.
Figure 2:
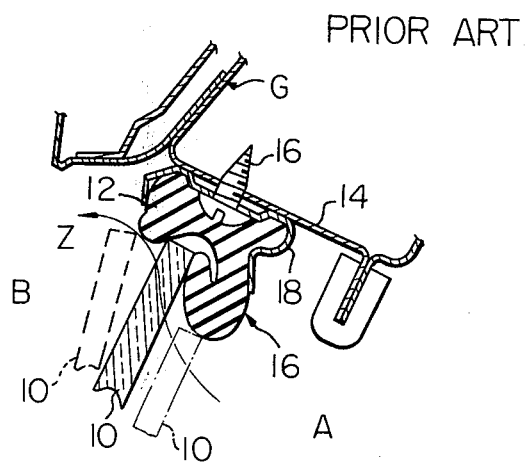
FIG. 2 is a cross section view, taken along the plane designated by line II—II in FIG. 1, showing the conventional construction of a weather strip fixture and described above.
Figure 3:
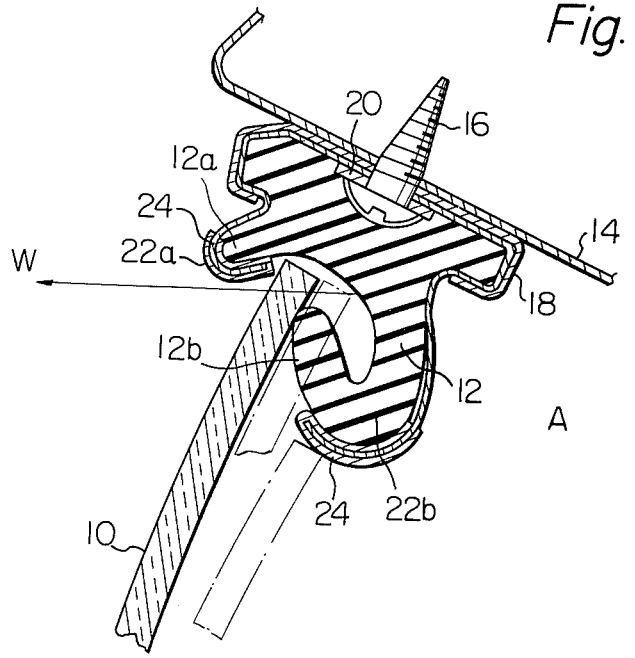
FIG. 3 is a cross section view, likewise taken along the plane designated by line II—II in FIG. 1, showing the construction of an improved weather strip fixture according to this invention as the first preferred embodiment thereof.
Figure 4:
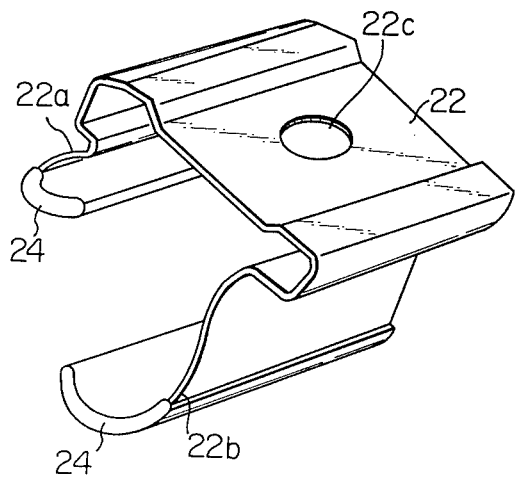
FIG. 4 is a perspective view of the weather strip fixture of FIG. 3.

Referring now to FIGS. 3 and 4, there are shown, in cross section, a window pane 10, a weather strip 12, an outer panel 14 of a roof side rail which is the upper edge portion of a door opening and on which strip 12 is fixed, a screw 16, and a weather strip fixture or retainer 18 (hereinafter referred to as a retainer). The weather strip 12 forms an outer lip portion 12a for abutting the window pane 10 on the outdoor side B thereof and an inner lip portion 12b for abutting the window pane 10 on the indoor side A thereof. The weather strip retainer 18 is adapted to rigidly hold the weather strip 12 in the channel thereof formed by stamping or the like in a generally C-letter shape, and is secured in position through a dust proof seal pad 20 by using screws 16 on the surface of the outdoor panel 14 of the roof side rail, which constitutes a part of the upper edge portion of the door opening of the body. There is further provided a fixture aid or clip 22 according to this invention formed in one piece of sheet metal in generally C-letter shape, profile having holding portions 22a and 22b which are respectively covered with an abutting member 24 made of synthetic resin, rubber, etc. There is interposed the clip 22, at least one, between the weather strip 12 and the weather strip retainer 18, and this clip is secured in position on the roof side rail outer panel 14 together with the weather strip retainer 18 by screwing the screws 16 through openings 22c. The holding portion 22a surrounds or wraps around the outer lip portion 12a on the exterior surface thereof, and the holding portion 22b wraps around the inner lip portion 12b in the same manner.

With such an arrangement of components of the door window according to this invention, where the door is closed with its window pane also closed (in a position indicated in solid lines in FIG. 3), the holding portion 22a of the clip 22 contacts or abuts through the member 24 the exterior leading edge portion of the window pane 10 together with the outer lip 12a of the weather strip 12. When the door is opened with the window pane closed or in raised up position, the top edge of the window pane moves in the direction indicated by the arrow W. With a partly opened automotive door, the holding portion 22a may afford suitable deformation within its limit of elasticity to allow passing-by movement of the window pane.

In this description of the first preferred embodiment of this invention, it has been described that the clip 22 is made of sheet metal, however, it is of course possible to produce the entire clip member by using thermoplastic synthetic resins, and in this case the abutting member 24 can be formed integrally with the holding portions 22a and 22b so that the finger portions may contact immediately with the leading edge of the window pane.

Figure 5:
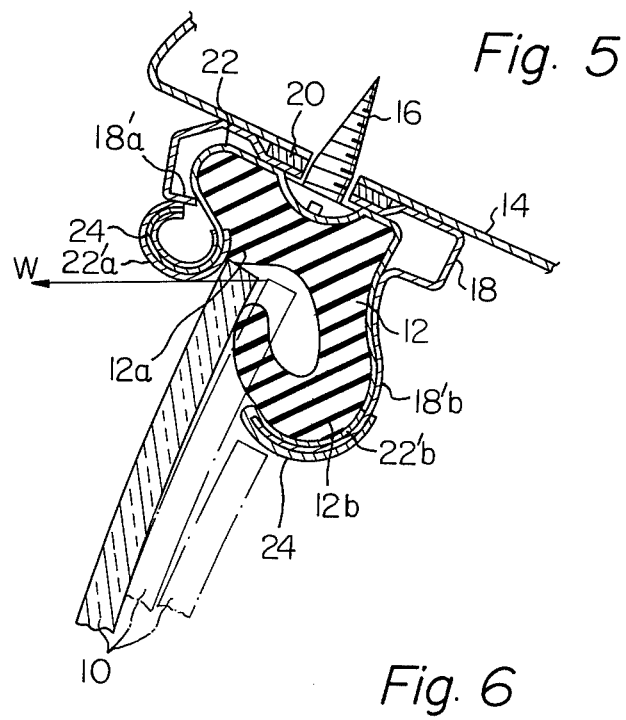
FIG. 5 is a cross section view similar to FIG. 3 showing the construction of a second preferred embodiment of this invention.
Figure 6:
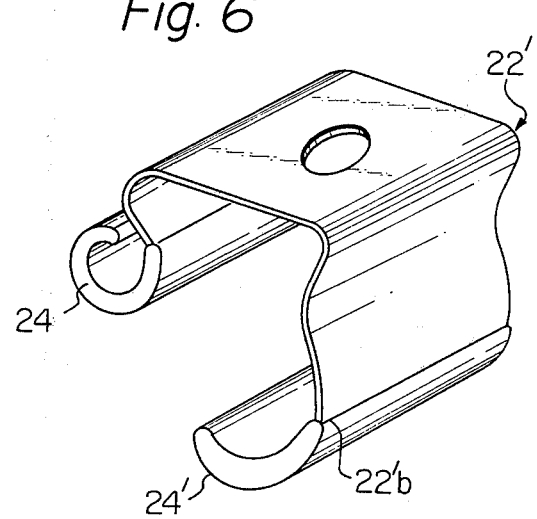
FIG. 6 is a perspective view of the weather strip fixture of FIG. 5.

Referring now to FIGS. 5 and 6, there is shown a second preferred embodiment of a weather strip fixture of this invention, in which the difference from the first embodiment of this invention shown in FIGS. 3 and 4 is such that the leading edge of the holding portion 22'a abutting the upper edge portion of the window pane 10 on the outdoor side B thereof is curved laterally outwardly to the cross section as shown in FIG. 5 instead of the cross sectional shape of FIG. 3 surrounding the outer circumference of the outer lip 12a so that the curved surface of the holding portion may abut the leading edge of the window pane on the outdoor side B, while the inner lip portion of the weather strip retainer 18' is extended to an extent along the outer surface of the clip 22' so that it may share the retension of the window pane 10 with the clip 22' on the indoor side A. In such an arrangement, the window pane 10 is duly sustained in a fully closed position by immediate contact between the window pane and the curved holding portion 22'a so that the window pane is prevented from being moved toward the outdoor side B due to pressure differences inside and outside during high speed driving. On the other hand, on the indoor side A of the cabin, the window pane 10 is positively guided by the resilient movement of the weather strip backed by the holding portion 22'b toward the outdoor side B from its originally undowelled position when the pane is in its closed position.

In summary, the advantageous effects and function attained from the use, in combination, of such components in the weather strip retainer for use in an automotive body construction are as follows:

1. When an automobile is operated with a door window pane left in a fully closed position, the window pane is positively fixed to a weather strip at the upper edge portion of the door so that the pane is prevented from being forced outwardly due to high pressure created in the cabin during high speed driving, thus preventing leaking air sounds through a gap between the weather strip and the leading edge of the window pane.

2. When the window pane is raised up to its fully closed position with the door closed, the window pane is initially guided to a properly closed position toward the outdoor side while moved upwardly, so as to prevent the weather strip from being deformed by the leading edge of the window pane as it is being raised to a closed position due to the resilient character of the weather strip thus affording the weather strip to properly engage with the window pane and provide positive sealing, so that the weather strip is made serviceable for a long time of use.

3. By virtue of the integral construction of the weather strip retainer according to this invention, it may be manufactured economically in comparison with the conventional separate type retainer.

4. By virtue of advantageous construction of the weather strip of this invention permitting subassembly of related components thereof prior to the assembly procedures to an automotive door opening, the assembly processes may be substantially rationalized.

What is claimed is:

1. A window pane fixing and sealing device for an automotive door window pane having a lowered, window open position and a raised, window closing position, comprising a weatherstrip with an outboard lip and an inboard lip contiguous to one another, said inboard lip having a bulbous bottom portion and an upwardly directed end portion; a clip surrounding substantially the whole contour of the weatherstrip, said clip having a first leg extending around the outboard lip and bearing on the upper edge of the window pane in its window closing position to hold the window pane preventing it from shifting outboard, and a second leg extending around the inboard lip excluding the end portion, wherein said inboard lip and said second leg of the clip are so located and configured that the upper edge of the window pane is guided successively along said second leg portion engaging the bulbous bottom portion and along said end portion of the inboard lip and is then correctly located between the inboard and outboard lips while moving from the window open position to the window closing position; and a retaining means for fixing the weatherstrip to an upper edge portion of a door opening of an automotive body and surrounding a part of said clip.

2. A device as in claim 1, in which an end portion of the outboard lip forms a bulbous projection and in which said first leg of the clip is shaped in an arc matching the bulbous pro-jection of the outboard lip.

3. A device as in claim 2, in which an end portion of the first leg and an end portion of the second leg engaging the bulbous bottom portion are respectively coated with resilient coatings.

4. A device as in claim 2, in which said clip is integrally formed of a synthetic resin.

5. A device as in claim 1, in which said first leg forms an extension extending apart from the outboard lip to form an arc, an end of said extension being secured to the retaining means.

6. A device as in claim 5, in which said extension of the first leg and an end portion of the second leg engaging the bulbous bottom portion are respectively coated with resilient coatings.

7. A device as in claim 5, in which said clip is integrally formed of a synthetic resin.

* * * * *